United States Patent
Lee

(10) Patent No.: US 7,209,663 B2
(45) Date of Patent: Apr. 24, 2007

(54) APPARATUS AND METHOD FOR REPEATING SIGNAL BY USING WIRELESS OPTICAL TRANSMISSION

(75) Inventor: Jong-Seob Lee, Ichon-shi (KR)

(73) Assignee: Curitel Communications, Inc. (KR)

( * ) Notice: Subject to any disclaimer, the term of this patent is extended or adjusted under 35 U.S.C. 154(b) by 564 days.

(21) Appl. No.: 10/744,317

(22) Filed: Dec. 22, 2003

(65) Prior Publication Data

US 2004/0258414 A1    Dec. 23, 2004

(30) Foreign Application Priority Data

Jun. 19, 2003   (KR)   ........................ 10-2003-0039692

(51) Int. Cl.
*H04B 10/00*    (2006.01)

(52) U.S. Cl. .................. 398/115; 398/116; 398/119; 398/120; 398/126; 398/135; 398/136; 398/96; 398/97; 398/103; 398/66; 398/67; 398/68; 398/70; 398/71; 398/72; 398/98; 398/100; 398/173; 398/175; 455/41.1; 455/41.2; 455/550.1; 455/12.1; 455/88; 455/82; 455/13.1; 455/13.3; 455/137

(58) Field of Classification Search ............... 398/115, 398/116, 119, 120, 126, 135, 136, 96, 97, 398/103, 175, 173, 70, 71, 72, 118, 66, 67, 398/68, 100; 455/41.1, 41.2, 550.1, 12.1, 455/88, 13.1, 82, 137, 13.3
See application file for complete search history.

(56) References Cited

U.S. PATENT DOCUMENTS 6,850,709 B1 *  2/2005  Gfeller et al. .............. 398/118

FOREIGN PATENT DOCUMENTS

| KR | 1998-054602 | 9/1999 |
|---|---|---|
| KR | 2002-0067413 | 9/2002 |

* cited by examiner

*Primary Examiner*—Hanh Phan
(74) *Attorney, Agent, or Firm*—Blakely Sokoloff Taylor & Zafman

(57) ABSTRACT

A repeating apparatus and method using wireless optical transmission is disclosed. The repeating apparatus includes a donor device for transmitting two identical copies of an optical signal by receiving a RF signal from a base station and electro-optic converting the RF signal to an optical signal, and for transmitting a RF signal by receiving two identical copies of the optical signal and optic-electro converting the optical signal to a RF signal; and a coverage device for transmitting a RF signal to a mobile communication terminal by receiving two identical copies of the optical signal from the donor device and optic-electro converting the two identical copies of the optical signal to the RF signal, and transmitting two optical signals to the donor device by receiving the RF signal from the mobile communication terminal and elector-optic converting the RF signal to the optical signal.

8 Claims, 7 Drawing Sheets

APPARATUS AND METHOD FOR REPEATING SIGNAL BY USING WIRELESS OPTICAL TRANSMISSION

FIELD OF THE INVENTION

The present invention relates to an apparatus and method for repeating signal by using wireless optical transmission; and, more particularly, to an apparatus and method for repeating signal by using wireless optical transmission for simultaneously transmitting the two identical copies of a wireless optical signal through two different routes, thereby minimizing the error rate and securing a stable environment for data transmission.

DESCRIPTION OF RELATED ART

Hereinafter, a mobile communication system will be quoted as a working example of the preferred embodiments of the present invention.

FIG. 1 is a perspective view of a wireless communication system.

Referring to FIG. 1, the mobile communication system includes a mobile communication terminal 10, a base station 11, a base station controller 12, a switching center 13, a location register 15 and a gateway switching center 14.

The base station 11 provides a wireless connection between the mobile communication terminal 10 and the mobile communication network. The base station controller 12 controls and manages the base station 11. The switching center 13 establishes a call connection to the mobile communication terminal 10. The location register 15 keeps track of the location of the mobile communication terminal 10 so as to make mobile communication services more accessible. The gateway switching center 14 provides a gateway to external public switched telephone networks (PSTNs) and other mobile communication service providers.

For the mobile communication network, the base station 11 is the most important factor in determining its economic efficiency and service quality. Regarding the construction of the mobile communication network, the economic efficiency always comes first in determining where to locate the base stations 10 and thus, there must be shadow region occurred such as a huge building, hills, undergrounds and mountains. The shadow region is hereinafter referred to as an area in which the transmission of radio waves is blocked by objects like buildings, mountains and suchlike. The reasons for the above-mentioned service inaccessibility come in a wide variety of forms. Nevertheless, these shortcomings in the mobile communication network have been easily overcome by the repeater.

FIGS. 2A to 2E are diagrams showing conventional repeaters implemented in the mobile communication network.

Referring to FIG. 2A and 2E, the conventional repeaters includes a repeater 21, a cable optical repeater 22 using an optical cable, a microwave repeater 23 using microwaves, a miniature base station 24 and a wireless optical repeater 25 using a wireless optical signal.

Firstly, referring to FIG. 2A, a repeater 21 is a general type repeater. The repeater 21 amplifies a radio frequency (RF) signal transmitted in mobile communication bandwidth from a base station 11 and transmits the RF signal to the shadow region. The repeater 21 is cost-effective as well as easy to install and operate. On the other hand, the one major drawback of the repeater 21 is that a radio wave signal between transmitting and receiving antennas could be coupled together and it causes oscillations. For the above-mentioned reason, the RF signals of the two antennas need to be kept separate. For keeping the RF signals separate, antennas need to be installed with a vertical clearance and the gain of the repeater must be limited. Therefore, the intensity of transmissible radio waves becomes limited and the mobile communication service coverage area would be limited too.

Referring to FIG. 2B, the cable optical repeater 22 converts a RF signal into an optical signal and transmits the optical signal through an optical cable installed between the base station 11 and the shadow area. The cable optical repeater 22 securely transports information across a long distance such as over 10 km without increased level of noise and signal distortion. On the other hand, the potential pitfall of using the cable optical repeater 22 and an optical cable is that this optical transmission technology can not be embraced prior to the provision of relevant infrastructure. In addition to the above, installing, hiring and fixing an optical cable are extremely costly in most cases.

Referring to FIG. 2C, the microwave repeater 23 transforms a RF signal into a microwave, typically relating to frequency signals ranging from 8 GHz to 30 GHz, by using a microwave repeater device installed between the base station and a cell. The microwave repeater 23 is easy to install as well as inexpensive to maintain. On the other hand, the one major drawback of using the microwave repeater 23 is that the use of frequencies within microwave bandwidth brings up the legal and security issues such as paying fees for the usage, dealing with local authority and wire-tapping.

Referring to FIG. 2D, the miniature base station 24 is a miniaturized version of the base station 11, but otherwise the installation of such station 24 is problematic as well as costly.

Referring to FIG. 2E, the wireless optical repeater 25 includes a donor device 26 and a coverage device 25. The donor device 26 transforms a wireless signal received from the base station 11 into an optical signal. The coverage device 25 transforms the optical signal transmitted from the donor device 26 back into a wireless signal for further transmission.

Unlike in the repeater 21, there exists no need in the wireless optical repeater 25 for installing antennas with a vertical clearance or entailing limited mobile communication service coverage due to a prescribed limit on the intensity of transmissible radio waves. As another advantage of the wireless optical repeater 25, the cost-effectiveness thereof, in conjunction with the user-friendliness thereof, makes such repeaters favored. In the wireless optical repeater 25, there are not any legal and security issues as such in relation to the use of frequencies within microwave bandwidth, as is usually the case in the microwave repeater 23. Hereinafter, the configuration and operation of the wireless optical repeater 25 are explained in details.

FIG. 3 is a diagram showing a conventional donor device in a repeater.

Referring to FIG. 3, the donor device of the repeater using conventional wireless optical transmission includes a donor antenna 30, a duplexer 31, a forward process unit 32, a transmitter telescope 34, a receiver telescope 35 and a backward process unit 33.

The donor antenna 30 transmits a RF signal to the base station 11, and vice versa. The duplexer 31 passes a RF signal transmitted from the base station 11 to a forward process unit 32 via the donor antenna 30. On the contrary, the duplexer 31 passes a RF signal transmitted from a backward process unit 33 on to the base station 11 via the donor antenna 30. The forward process unit 32 transforms the RF signal transmitted from the duplexer 31 into the optical signal. The transmitter telescope 34 sends out an optical signal on receipt of the optical signal from the forward process unit 32. The receiver telescope 35 receives the optical signal transmitted from a coverage device. The backward process unit 33 transforms the optical signal transmitted from the receiver telescope 35 into a RF signal.

The forward process unit 32 includes a low noise amplifier 321, a RF filter 322, an electro-optic (E/O) converter 323 and an optical amplifier 324. The operation of the forward process unit 32 is performed as follows. A RF signal received from the donor antenna 30 through the duplexer 31 is transmitted to the low noise amplifier 321. Low noise amplification at the low noise amplifier 321 is performed first. Secondly, the RF filter 322 filters the low noise amplified RF signal. Thirdly, the E/O converter 323 converts the low noise amplified RF signal to an optical signal. The optical amplifier 324 amplifies the optical signal. Lastly, the amplified optical signal is transmitted by the transmitter telescope 34.

The backward process unit 33 includes an optic-electro (O/E) converter 334, a low noise amplifier 333, a RF filter 332, and a power amplifier 324. The operation of the backward process unit 33 is described as follows. An optical signal received from the receiver telescope 35 transmitted to the optic-electro (O/E) converter. The optic-electro (O/E) converter 334 converts the optical signal to RF signals. Secondly, the low noise amplifier 333 amplifies low noise in the RF signals. The RF filter 332 filters the low noise amplified RF signal. Power is amplified at the power amplifier 333 and the amplified RF signal is transmitted from a donor antenna 30 via a duplexer 31 to the base station 11.

FIG. 4 is a perspective view of a coverage device used in a repeater using wireless optical transmission.

Referring to FIG. 4, the coverage device has the same configuration as the donor device does, but otherwise the coverage device follows the same process as the donor device does but in a reverse order.

The coverage device includes a receiver telescope 44, a forward process unit 42, a coverage antenna 40, a duplexer 41, a backward process unit 43 and a transmitter telescope 35.

The receiver telescope 44 receives an optical signal transmitted from the donor device. The forward process unit 42 transforms the optical signal transmitted from the receiver telescope 44 into a RF signal. The coverage antenna 40 transmits a RF signal to the mobile communication terminal 10, and vice versa. The duplexer 41 transmits the RF signal transmitted from the forward process unit 42 via the coverage antenna 40. On the contrary, the duplexer 41 passes the RF signal transmitted from the mobile communication terminal 10 on to the backward process unit 43 via the coverage antenna 40. The backward process unit 43 transforms the RF signal transmitted from the duplexer 41 into an optical signal. The transmitter telescope 45 sends out an optical signal on receipt of the optical signal from the forward process unit 32.

The forward process unit 42 includes an optic-electro (O/E) converter 421, a low noise amplifier 422, a RF filter 423 and a power amplifier 424.

The backward process unit 43 includes a low noise amplifier 434, a RF filter 433, an electro-optic (E/O) converter 432 and an optical amplifier 431. The operation of the backward process unit 43 is that of the donor device in reverse.

It is often the case that the wireless optical signal transmission is climate-dependent and vulnerable to a malfunction caused by an external force. In other words, the successful transmission of the wireless optical signal is contingent on the weather conditions. Here, if data is to be transmitted through an optical cable at the rate of 1 Gbps, that is, 1 bit is roughly equivalent to 1 ns, an instant blockage in the optical cable will do a significant damage to the transmission of data as a whole, resulting in data being corrupted. This is the one major drawback of the wireless optical signal transmission.

SUMMARY OF THE INVENTION

It is, therefore, an object of the present invention to provide an apparatus and method for repeating signal by using wireless optical transmission for simultaneously transmitting the two identical copies of a wireless optical signal through two different routes, thereby minimizing the error rate and securing a stable environment for data transmission.

In accordance with an aspect of the present invention, there is provided an apparatus for repeating signal by using wireless optical transmission, including: a donor device for transmitting two identical copies of an optical signal through two different routes by receiving a RF signal from a base station and electro-optic converting the RF signal to an optical signal, and for transmitting a RF signal of the base station by receiving two identical copies of the optical signal through two different routes and optic-electro converting the optical signal to a RF signal; and a coverage device for transmitting a RF signal to a mobile communication terminal by receiving two identical copies of the optical signal through two different routes from the donor device and optic-electro converting the two identical copies of the optical signal to the RF signal, and transmitting two identical copies of the optical signal through two different routes to the donor device by receiving the RF signal from the mobile communication terminal and elector-optic converting the RF signal to the optical signal.

In accordance with another aspect of the present invention, there is provided a method for repeating signal by using wireless optical transmission, the method including the steps of: a) at a donor device, receiving a RF signal from a base station, electro-optic converting the RF signal into an optical signal and transmitting two identical copies of the optical signal through two different routes; b) at a coverage device, receiving two identical copies of the optical signal through two different routes from the donor device, optic-electro converting the optical signal into the RF signal and transmitting the RF signal to a mobile communication terminal; c) at the coverage device, receiving the RF signal from the mobile communication terminal, electro-optic converting the RF signal into an optical signal and transmitting two identical copies of the optical signal through two different routes; and d) at the donor device, receiving a two identical copies of the optical signal through two different routes from the coverage device, optic-electro converting the optical signal into a RF signal and transmitting the RF signal to the base station.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
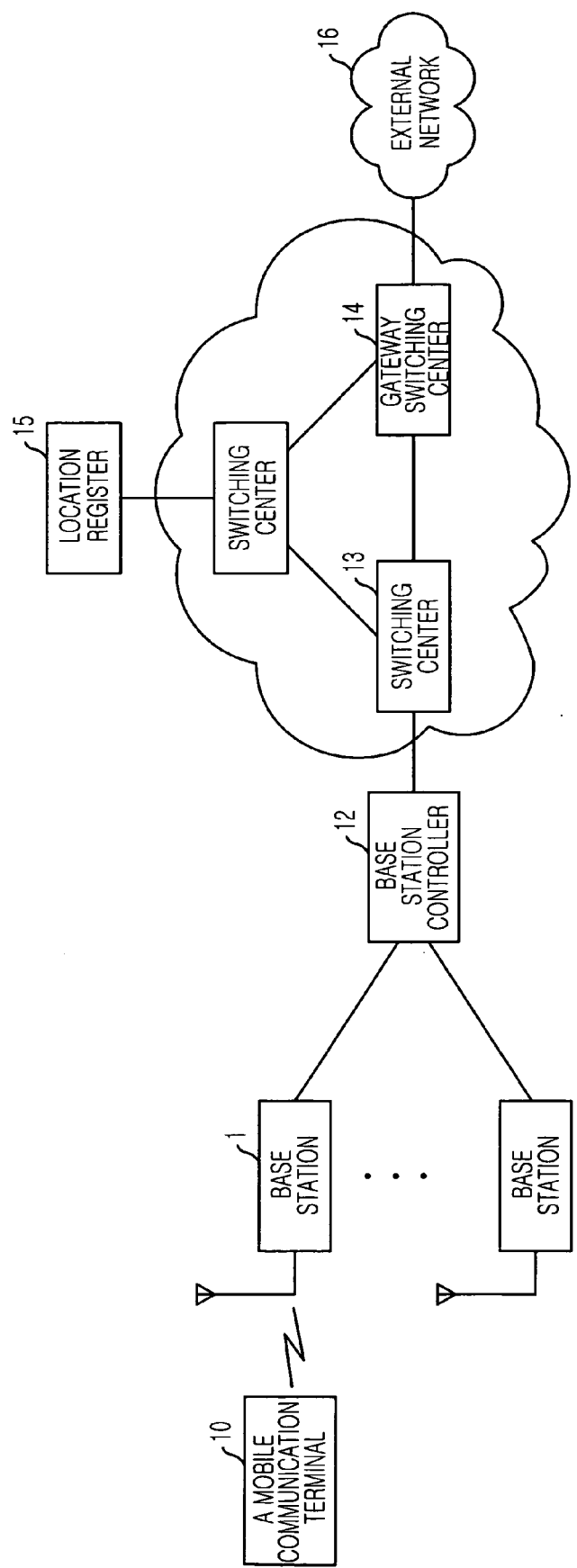
FIG. 1 is a perspective view of a wireless communication system.
Figure 2A:
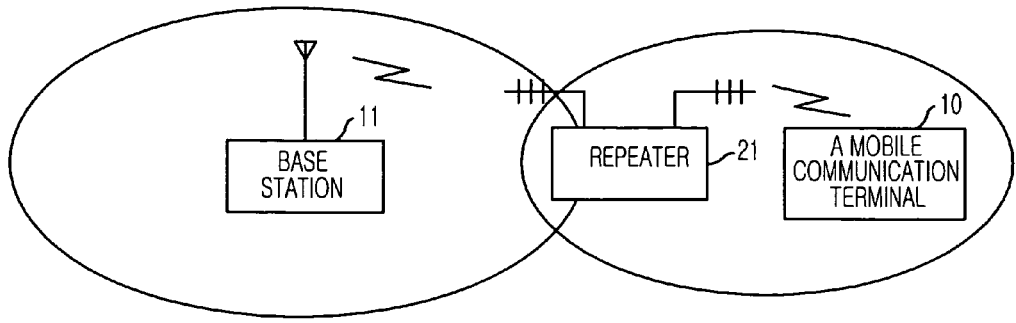
FIGS. 2A and 2E are a perspective view illustrating various conventional repeaters of wireless communication system.
Figure 2B:
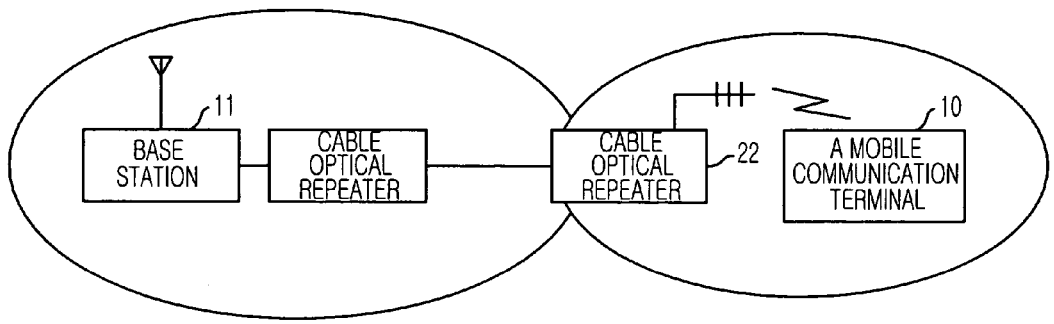
Figure 2C:
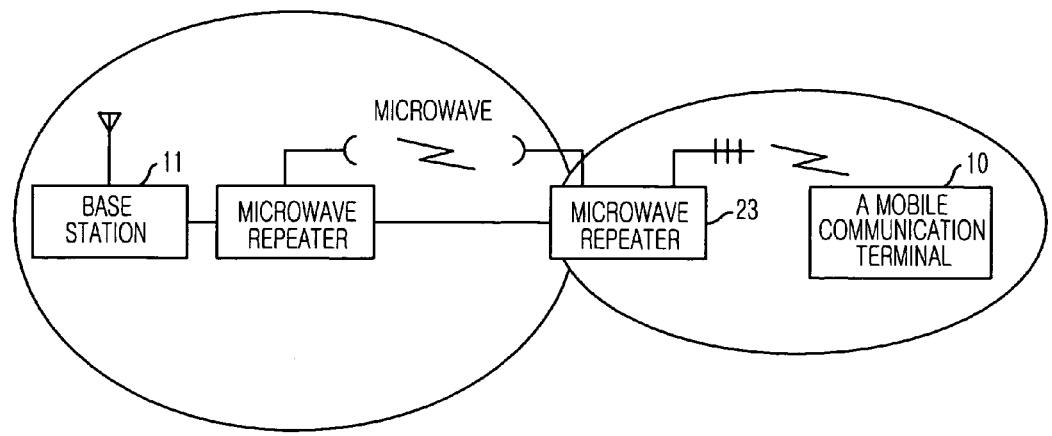
Figure 2D:
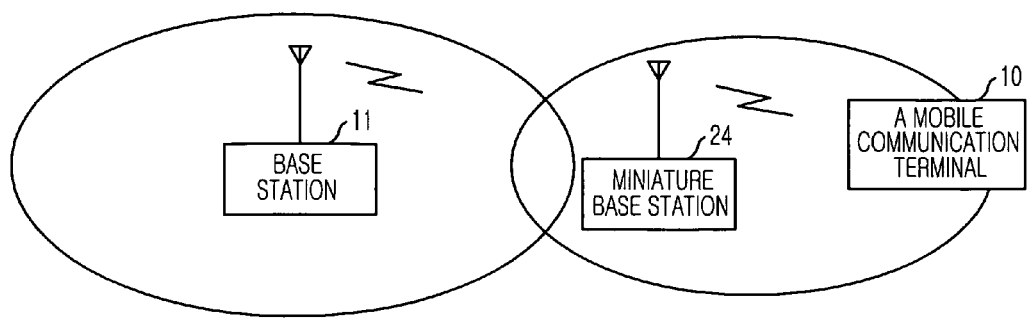
Figure 2E:
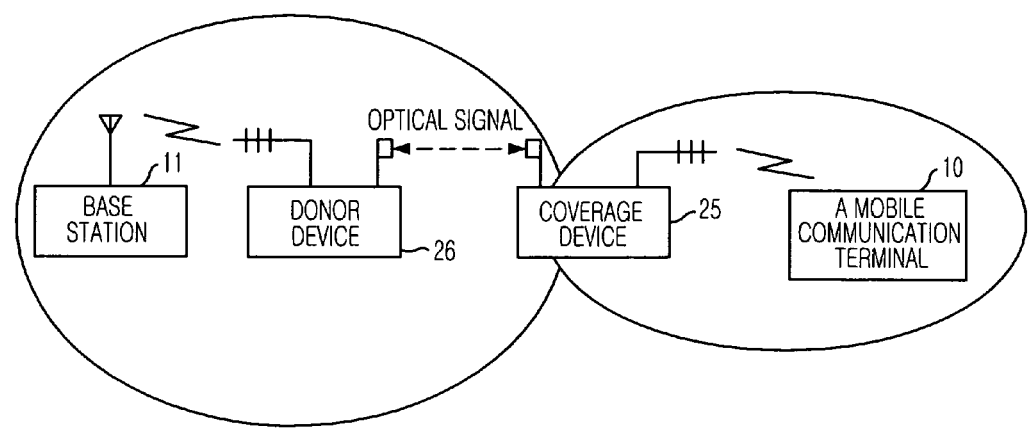
Figure 3:
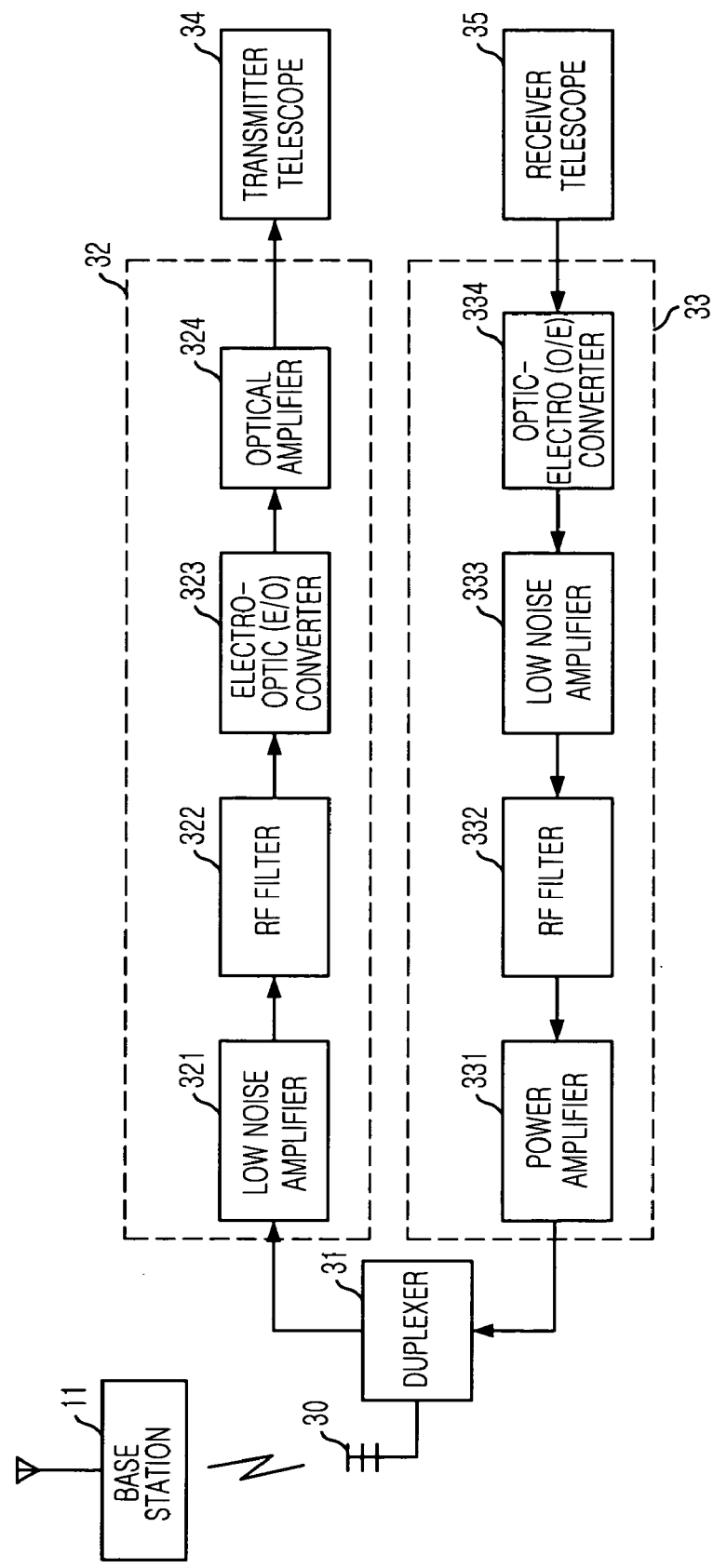
FIG. 3 is a perspective view illustrating the configuration of a conventional donor device used in a repeater using conventional wireless optical transmission.
Figure 4:
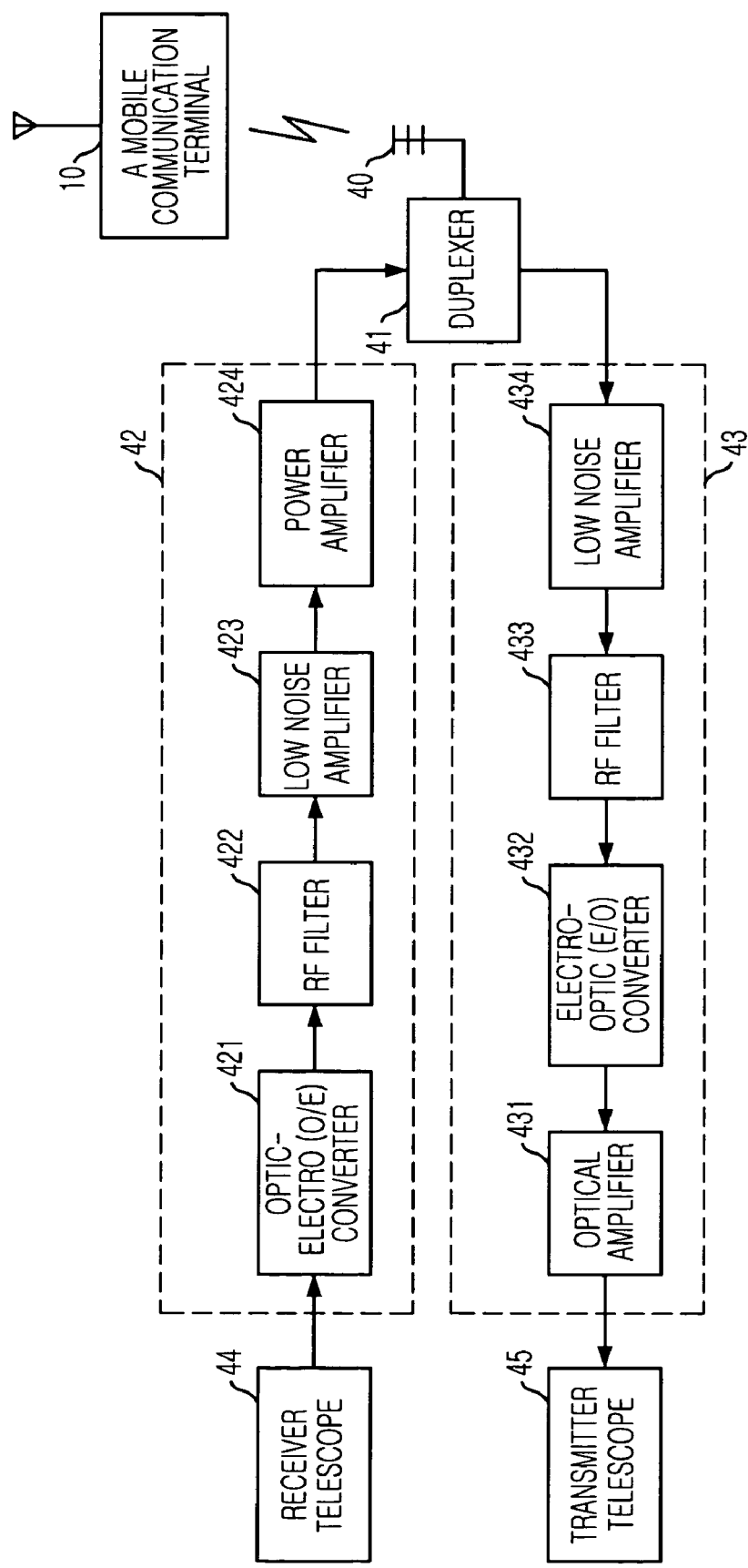
FIG. 4 is a perspective view of a conventional coverage device used in a repeater using wireless optical transmission.
Figure 5:
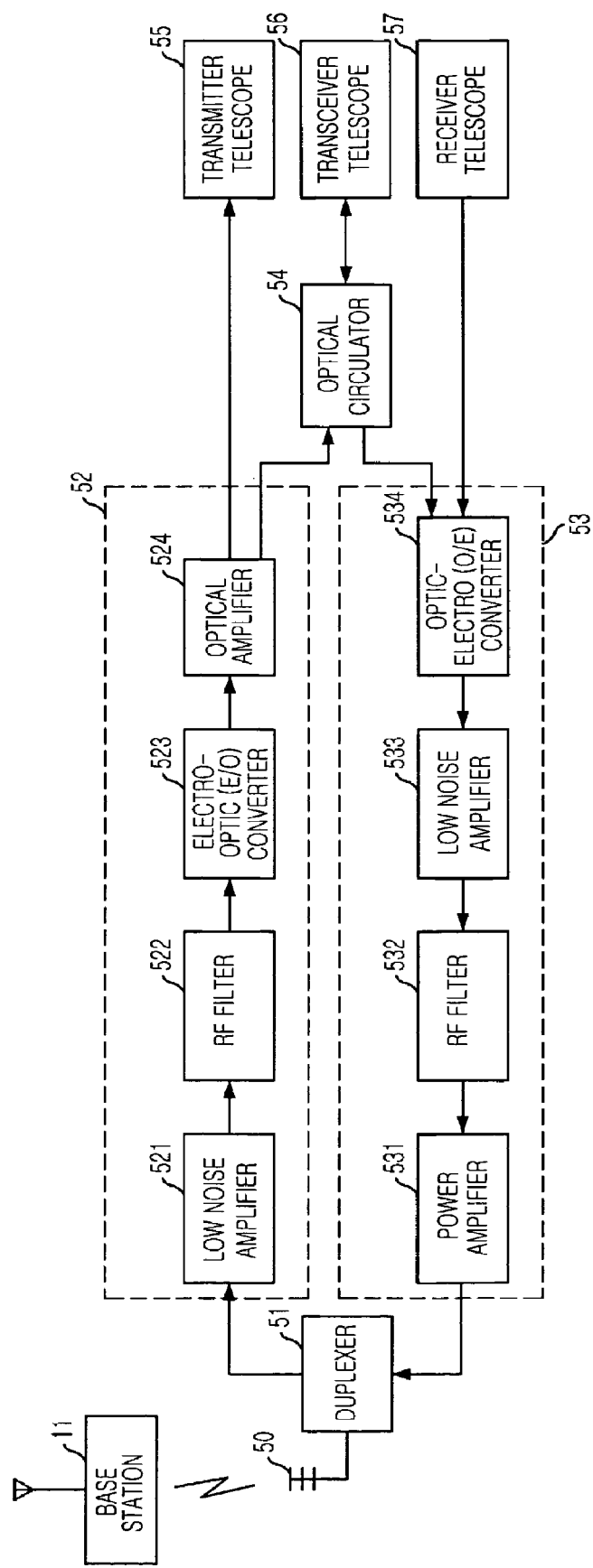
FIG. 5 is a perspective view illustrating the configuration of a donor device used in a repeater using wireless optical transmission in accordance with a preferred embodiment of the present invention.

FIG. 5 is a perspective view illustrating the configuration of a donor device used in a repeater using wireless optical transmission in accordance with a preferred embodiment of the present invention.

Referring to FIG. 5, the donor device includes a donor antenna 50, a duplexer 51, a forward process unit 52, a transmitter telescope 55, an optical circulator 54, a transceiver telescope 56, a receiver telescope 57 and a backward process unit 53.

The donor antenna 50 transmits a RF signal to the base station 11, and vice versa. The duplexer 51 passes the RF signal transmitted from the base station 11 to a forward process unit 52 via the donor antenna 50. On the contrary, the duplexer 51 passes a RF signal transmitted from a backward process unit 53 on to the base station 11 via the donor antenna 50. The forward process unit 52 transforms the RF signal transmitted from the duplexer 51 into an optical signal. The transmitter telescope 55 transmits the optical signal from the forward process unit 52. The optical circulator 54 receives the optical signal from the forward process unit 52 and transmits to the transceiver telescope 56. Also, the optical circulator 54 receives the optical signal from the transceiver telescope 56 and transmits the optical signal to the backward process unit 53. The transceiver telescope 56 transmits the optical signal from the optical circulator 54 and receives an optical signal from a coverage device. The receiver telescope 57 receives the optical signal transmitted from the coverage device. The backward process unit 53 transforms the optical signal transmitted from the receiver telescope 57 or the optical circulator 54 into a RF signal which is, in turn, to be delivered to the duplexer 51.

The forward process unit 52 includes a low noise amplifier 521, a RF filter 522, an electro-optic (E/O) converter 523 and an optical amplifier 524. The low noise amplifier 521 reduces noise on a RF signal transmitted from the duplexer 51, thereby amplifying the RF signal. The RF filter 522 filters the RF signal transmitted from the low noise amplifier 521. The E/O converter transforms the RF signal transmitted from the RF filter 522 into an optical signal using a laser diode (LD). The optical amplifier 524 amplifies the optical signal transmitted from the E/O converter. Here, the wavelength of the signal in the LD must be equal to the wavelength of the amplified signal coming out of the optical amplifier 524. A direct modulation method using the laser diode (LD) modulates a signal multiplexed by an electric pulse string to an optical signal by inputting the multiplexed signal to a driving unit of the diode. The modulated optical signal acts according to the response characteristic of the LD wherein an optical pulse is transmitted via the turning on and off of the LD following a relevant bit string. However, an indirect modulation method may be used in the present invention instead of using the direct modulation method. In the indirect modulation method, the laser diode is always turned on and the signal is modulated by using external modulator.

The backward process unit 53 includes an optic-electro (O/E) converter 534, a low noise amplifier 533, a RF filter 532, and an optical amplifier 531. The O/E converter 534 converts an optical signal transmitted from the receiver telescope 57 or the optical circulator 54 into a RF signal. The low noise amplifier 533 reduces noise on the RF signal transmitted from the O/E converter 534, thereby amplifying the signal. The RF filter 532 filters the RF signal transmitted from the low noise amplifier 533. The power amplifier 531 amplifies the RF signal transmitted from the RF filter 532. Here, the optical signal being transmitted from the coverage device to the donor device is attenuated for various reasons. Accordingly, if the optical signal is not significantly attenuated, it is not necessary to amplify the optical signal to be converted to the RF signal. Therefore, it is possible that the optical signal may be directly converted to the RF signal without amplifying the optical signal. However, if the optical signal is significantly attenuated, the optical signal needs to be amplified.

Furthermore, the making use of the low noise amplifier 533 and the RF filter 532 is contingent on the intensity of a converted RF signal coming out of the optic-electro (O/E) converter 534.

On the other hand, each of the two identical copies of an optical signal processed at the forward process unit 52 is transmitted simultaneously to its corresponding destination, optical circulator 54 and transmitter telescope 55. The optical circulator 54 transmits an optical signal to the coverage device via the transceiver telescope 56. The above-mentioned safety mechanism is put in place to secure a stable environment for data transmission. In the event of an interruption to one of two routes, thereby doing damage to a signal therein, a signal transmitted via the other route can be used to restore the damaged signal. Accordingly, the reliability of data transmission is secured when each of the two output signals is checked through to determine if one signal is the exact match of the other.

The above mentioned operations are same for the donor device of the backward process unit 53. Specifically, two identical copies of an optical signal is transmitted to the backward process unit 53 via two different routes, namely one via the optical circulator 54 and the other via the receiver telescope 57. Most often, the backward process units 53 takes an optical signal transmitted from the optical circulator 54 and then transforms the signal into a RF signal. On the contrary, in the event of an interruption to the signal transmission, an optical signal transmitted from the receiver telescope 57 is used instead. On the other hand, both of the two optical signals are transformed into a RF signal. Then, each of the two RF signals is checked through to determine if one signal is the exact match of the other to make certain the data transmission is reliable.

Following on from the above, as regards the above-mentioned selection process performed at the O/E converter 534 of the backward process unit 53 by a controller (not shown) coupled to the O/E converter 534, wherein the controller may be implemented by using a computer. The controller controls the O/E converter 534 to choose between the two available optical signals and to pass the select signal to the low noise amplifier 533. Accordingly, the way in which each of the two signals is checked through to determine if one signal is the exact match of the other is as follows. Firstly, the O/E converter 534 transforms both of the two optical signals into a RF signal which is, in turn, to be fed into the controller connected to the O/E converter 534. Secondly, the controller controls the O/E converter 534 to filter out those signals in which the two RF signals do not match. Thirdly, a select signal is transferred to the low noise amplifier 533. The same operations are implemented for the selection process performed at the O/E converter 621 of the forward process unit 62 as illustrated below in FIG. 6.

Figure 6:
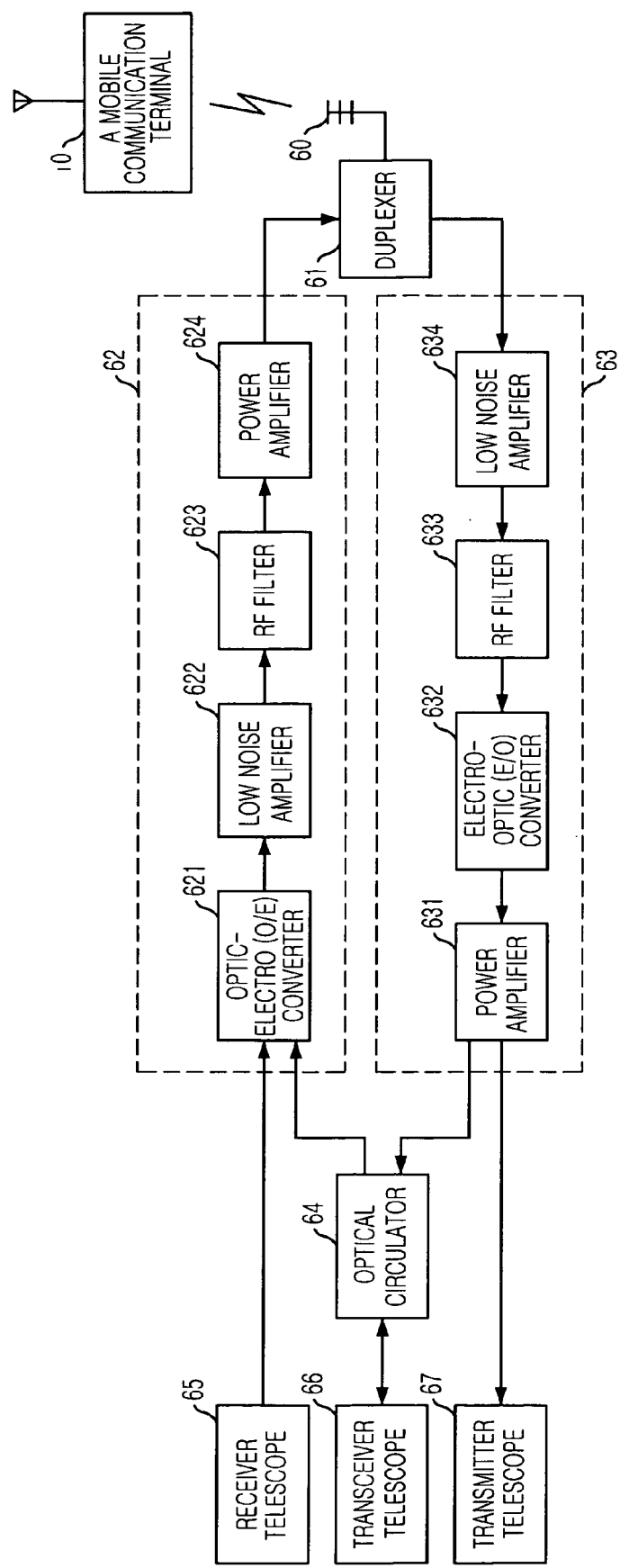
FIG. 6 is a perspective view illustrating the configuration of a coverage device used in a repeater using wireless optical transmission in accordance with a preferred embodiment of the present invention.

FIG. 6 is a perspective view illustrating a coverage device used in a repeater using wireless optical transmission in accordance with a preferred embodiment of the present invention.

Referring to FIG. 6, the coverage device has the same configuration as a donor device does, but otherwise the coverage device follows the same process as the donor device does but in a reverse order.

The coverage device used in the repeater using wireless optical transmission includes a receiver telescope 65, a transceiver telescope 66, an optical circulator 64, a forward process unit 62, a coverage antenna 60, a duplexer 61, a backward process unit 63 and a transmitter telescope 67.

The receiver telescope 65 receives an optical signal transmitted from the donor device. The transceiver telescope 66 passes the optical signal from the optical circulator 64 to the donor device. In addition, the transceiver telescope 66 receives an optical signal transmitted from the donor device. The optical circulator 64 causes an optical signal to branch toward the forward process unit 62 on receipt of the signal from a transceiver telescope 66. In addition, the optical circulator 64 causes an optical signal to branch toward a transceiver telescope 66 on receipt of the signal from the backward process unit 63. The forward process unit 62 transforms an optical signal transmitted from the optical circulator 64 or the receiver telescope 65 into a RF signal. The coverage antenna 60 transmits a RF signal to the mobile communication terminal 10, and vice versa. The duplexer 61 transmits a RF signal transmitted from a forward process unit 62 via the coverage antenna 60. On the contrary, the duplexer 61 passes a RF signal transmitted from the mobile communication terminal 10 on to the backward process unit 63 via the coverage antenna 60. The backward process unit 63 transforms the RF signal transmitted from the duplexer 61 into an optical signal. The transmitter telescope 67 transmits the optical signal on receipt of the optical signal from the backward process unit 52.

The forward process unit 62 includes an optic-electro (O/E) converter 621, a low noise amplifier 622, a RF filter 623 and a power amplifier 624. The backward process unit 63 includes a low noise amplifier 634, a RF filter 633, an electro-optic (E/O) converter 632, and an optical amplifier 631. The operation of the coverage device is that of the donor device in a reverse order.

On the other hand, the use of the optical amplifier, the low noise amplifier and the RF filter is decided based on the weather conditions as well as the type of a place in which a repeater is located. In other words, the use of a high power optical amplifier is a must for a long distance communication. In a harsh climate, there exists a need for the increase in the intensity of an optical signal.

The transceiver telescope in the above mentioned preferred embodiment of the present invention can be implemented by using a receiver and a transmitter separately in another preferred embodiment. If the transceiver telescope is implemented by using the independent receiver and transmitter, the optical circulator is not required.

The effect of the present invention as recited in the above is briefly summarized herein as follows. As is usually the case in a typical wireless optical repeater using wireless optical communication, the wireless optical signal transmission is climate-dependent and vulnerable to a malfunction caused by an external force. Unlike the typical wireless optical repeater, a repeater using wireless optical transmission in accordance with the preferred embodiments of the present invention simultaneously sends out the two identical copies of a wireless optical signal via two different routes, thereby minimizing the error rate and securing a stable environment for data transmission.

While the present invention has been described with respect to certain preferred embodiments, it will be apparent to those skilled in the art that various changes and modifications may be made without departing from the scope of the invention as defined in the following claims.

What is claimed is:

1. A repeater using wireless optical transmission, comprising:

a donor device for transmitting two identical copies of an optical signal through two different routes by receiving a RF signal from a base station and electro-optic converting the RF signal to an optical signal, and for transmitting a RF signal to the base station by receiving two identical copies of the optical signal through two different routes and optic-electro converting the optical signal to a RF signal; and a coverage device for transmitting a RF signal to a mobile communication terminal by receiving two identical copies of the optical signal through two different routes from said donor device and optic-electro converting the two identical copies of the optical signal to the RF signal, and transmitting two identical copies of the optical signal through two different routes to said donor device by receiving the RF signal from the mobile communication terminal and elector-optic converting the RF signal to the optical signal, wherein the donor device includes:

a donor antenna for transmitting an internal RF signal to the base station and receiving an external RF signal from the base station;

a first duplex means for passing the external RF signal and transmitting the internal RF signal to the base station;

a first forward process means for transforming the external RF signal from the first duplex means into an internal optical signal;

a first transmission means for externally transmitting the internal optical signal from the first forward process means;

a first optical signal duplex means for receiving the internal optical signal and a first external optical signal and distributing the internal optical signal and the first external optical signal;

a first transceiver means for receiving the internal optical signal from the first optical signal duplex means and externally transmitting the internal optical signal, and receiving an external optical signal from said coverage device and transmitting to the first optical signal duplex means as the first external optical signal;

a first reception means for receiving the external optical signal from said coverage device as a second external optical signal; and a first backward process means for receiving the second external optical signal from the first reception means and the first external optical signal from said first transceiver means through said first optical signal duplex means, converting to the internal RF signal, and passing the internal RF signal to the first duplex means.

2. The repeater as recited in claim 1, wherein the first backward process means receives the first external optical signal and the second external signal through two different routes, transforms the first external optical signal transmitted from said first optical signal duplex means into the internal RF signal based on instructions given by a first control means and transforms the second external optical signal transmitted from said first reception means, if only the first optical signal duplex means is malfunctioning based on instructions given by the first control means.

3. The repeater as recited in claim 1, wherein the first backward process means receives the first external optical signal and the second external signal through two different routes, compares the first external optical signal and the second external optical signal by using a first control means and transforms the first external optical signal transmitted from said first optical signal duplex means into the internal RF signal in a case that the first external optical signal and the second external optical signal are identical as a result of comparison.

4. The repeater as recited in claim 1, wherein the coverage device includes:

a second optical signal reception means for receiving an external optical signal transmitted from the donor device and passing the external optical signal as a first external optical signal;

a second optical signal transceiver means for receiving an external optical signal from the donor device and passing the external optical signal as a second external optical signal, receiving an internal optical signal and externally transmitting the internal optical signal to the donor device;

a second optical signal duplex means for receiving the second external optical signal and passing the second external optical signal, and receiving the internal optical signal and passing the internal optical signal to the second optical signal transceiver means;

a second forward process means for receiving the first external optical signal and the second external optical signal and transforming one of the first external optical signal and the second external optical signal into an internal RF signal;

a coverage antenna for transmitting of the internal RF signal to the base station and receiving of an external RF signal from the base station;

a second signal duplex means for receiving the internal RF signal and passing the internal RF signal to the coverage antenna, and receiving the external RF signal and passing the external RF signal;

a second backward process means for transforming the external RF signal received from the second signal duplex means into the internal optical signal; and a second optical signal transmission means for transmitting the internal optical signal receiving from the second backward process means.

5. The repeater as recited in claim 4, wherein the second forward process means receives the first external optical signal and the second external signal through two different routes, transforms the first external optical signal transmitted from said second optical signal duplex means into the internal RF signal based on instructions given by a second control means and transforms the second external optical signal transmitted from said second reception means, if only the second optical signal duplex means is malfunctioning based on instructions given by the second control means.

6. The repeater as recited in claim 4, wherein the second forward process means receives the first external optical signal and the second external signal through two different routes, compares the first external optical signal and the second external optical signal by using a second control means and transforms the first external optical signal transmitted from said second optical signal duplex means into the internal RF signal in a case that the first external optical signal and the second external optical signal are identical as a result of comparison.

7. A method for repeating signal by using wireless optical transmission, the method comprising the steps of:

a) at a donor device, receiving a RF signal from a base station, electro-optic converting the RF signal into an optical signal and transmitting the optical signal through two different routes respectively;

b) at a coverage device, receiving the optical signal through two different routes from the donor device, optic-electro converting the optical signal into the RF signal and transmitting the RF signal to a mobile communication terminal;

c) at the coverage device, receiving the RF signal from the mobile communication terminal, electro-optic converting the RF signal into an optical signal and transmitting the optical signal through two different routes; and d) at the donor device, receiving the optical signal through two different routes from the coverage device, optic-electro converting the optical signal into a RF signal and transmitting the RF signal to the base station, wherein in the steps b) and d), the optical signal is received from a receiver telescope and a transceiver telescope respectively, the optical signal from the transceiver telescope into the RF signal is transmitted based on instructions given by a controller and transforms the optical signal from the receiver telescope, if only the transceiver telescope is malfunctioning based on instructions given by the controller.

8. The method as recited in claim 7, wherein in the steps b) and d), the optical signal is received from a receiver telescope and a transceiver telescope respectively, and the optical signal from the transceiver telescope is transformed into the RF signal in a case that the optical signal received from the receiver telescope and the optical signal received from the transceiver telescope are identical to each other.

* * * * *